H. C. HART.
HANDLED IMPLEMENT.
APPLICATION FILED SEPT. 1, 192
1,376,764.
Patented May 3, 1921.
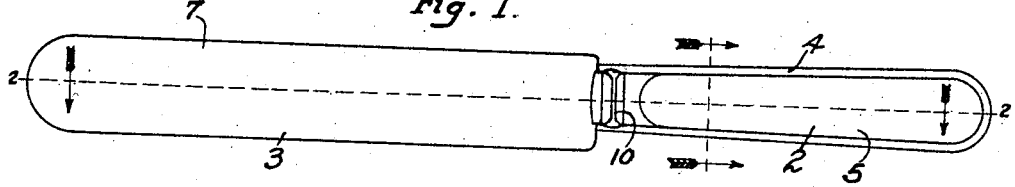
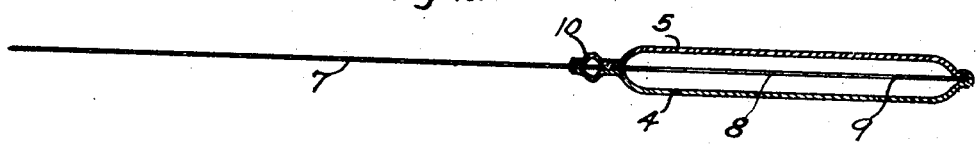
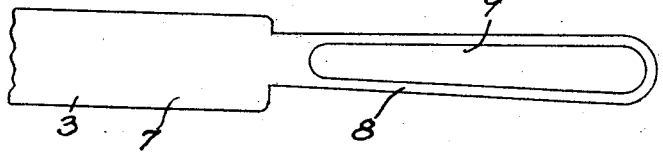
INVENTOR
BY
ATTORNEY

UNITED STATES PATENT OFFICE.

HUBERT C. HART, OF UNIONVILLE, CONNECTICUT.

HANDLED IMPLEMENT.

1,376,764.  Specification of Letters Patent.  Patented May 3, 1921.

Application filed September 1, 1920. Serial No. 407,474.

*To all whom it may concern:*

Be it known that I, HUBERT C. HART, a citizen of the United States, residing at Unionville, in the county of Hartford and State of Connecticut, have invented certain new and useful Improvements in Handled Implements, of which the following is a specification.

This invention relates to handled implements. There is a large number of this kind of implements in connection with which the invention may be used. I might mention among them knives, forks, garden tools of various kinds, and many other such devices. The implement involves a handle member and a blade member the type of which will vary somewhat in accordance with the nature of the implement. The primary motive I have in view is the provision of means of an inexpensive nature by which the parts of the implement will be held assembled in a strong and substantial manner, yet the article is light, a point of consideration.

In the drawings accompanying and forming part of the present specification I have shown in detail a form of embodiment of the invention which to enable those skilled in the art to practise the same will be set forth fully in the following description. The novelty of the invention will be included in the claim succeeding said description. I am obviously not restricted to the exact showing made by said drawings and description. I may depart therefrom in a number of respects within the scope of the invention defined by said claim.

Referring to said drawings:

Figure 1 is a top plan view of a handled implement involving the invention.

Fig. 2 is a longitudinal section on the line 2—2 of Fig. 1, looking in the direction of the arrow.

Fig. 3 is a cross section through the handle in finished condition.

Fig. 4 is a top plan view of the rear end of the blade member.

Fig. 5 is a view corresponding to Fig. 3 before the handle is closed.

Like characters refer to like parts throughout the several views.

The device includes in its makeup a handle member and a blade member denoted in a general way respectively by 2 and 3. The handle member 2 as shown comprises two sections as 4 and 5 both of them hollow and usually of sheet metal. The two sections 4 and 5 are practically the same although the section 4 is a little deeper than the section 5 having a continuous flange or lip along its sides and back end, this flange being adapted to be rolled over the corresponding outer upper marginal portions of the coacting section 5.

The blade member comprises a working portion or blade 7 and a tang 8, the tang being in one piece with the blade and the latter being shown of a character to adapt the implement for use as a knife although from the observations I have already made this is not always necessary. The tang 8 like the blade 7 is shown as being flat and as having a longitudinal slot 9 for practically the complete length thereof, the tang as a consequence being of skeleton formation.

In assembling the parts the skeleton tang is laid within the upper open portion of the section 4 of the handle with the marginal portion of said section 4 extending beyond the marginal portion of the tang sufficiently to receive within the opening of the section 4 the open side of the section 5. This assembles the parts. When they are associated the marginal portion of the section 4 is rolled over the lateral and rear end portions of the section 5 thus securely clamping the tang in place. The shoulder between the junction of the blade 7 and the flat tang 8, at this time abuts substantially against the end of the handle member 2.

It will be noticed that the front end portions of the lateral parts of the marginal flange of the main section 4 are curled or bent around the bolster portion 10 of the section 5 as best shown in Fig. 1. This effectually aids in holding the sections of the handle in assembled relation with each other and also in increasing their hold upon the tang. The tang it will be clear is quite flat and this is important in that nothing is required in the way of pressure on the tang to maintain the parts in assembled relation.

The construction described is light yet thoroughly strong and the parts are effectually held together and although the handle is practically hollow and although it consists of two pieces the flat tang effectually prevents entrance of liquid into the handle.

I have noted the fact that the flat tang 8 has in it a longitudinal slot. By reason of this fact the tang is made sufficiently flexible, yet its strength is not affected to insure the sections of the handle portion to obtain a firm and substantial grip on the lateral and rear edge parts of said tang.

What I claim is:

A handled implement comprising a handle portion and a working portion having a tang, the tang being longitudinally slotted to thereby leave a slender marginal portion, the handle portion comprising two sections which jointly clamp the tang and into one of which the tang is fitted, the tang being initially flat throughout its complete length and the marginal portion of one of the sections of the handle being flanged over the corresponding marginal portion of the other section of the handle, the inner flanged portion of the flanged section being curled around the bolster portion of the complemental section to positively prevent movement between the handle portion and the tang.

In testimony whereof I affix my signature.

HUBERT C. HART.

Witnesses:
 HEATH SUTHERLAND,
 ELSIE M. RABENSTEIN.